Dec. 13, 1949     F. W. THOMPSON     2,491,399
ELECTRIC AIR HEATER

Filed July 20, 1946     3 Sheets-Sheet 1

*INVENTOR.*
FRANK W. THOMPSON,
BY *Irving Seidman*
ATTORNEY

Dec. 13, 1949     F. W. THOMPSON     2,491,399
ELECTRIC AIR HEATER

Filed July 20, 1946     3 Sheets-Sheet 2

INVENTOR.
FRANK W. THOMPSON,
BY Irving Seidman
ATTORNEY

Dec. 13, 1949     F. W. THOMPSON     2,491,399
ELECTRIC AIR HEATER

Filed July 20, 1946     3 Sheets-Sheet 3

INVENTOR.
FRANK W. THOMPSON,
BY Irving Seidman
ATTORNEY

Patented Dec. 13, 1949

2,491,399

UNITED STATES PATENT OFFICE 2,491,399

ELECTRIC AIR HEATER

Frank W. Thompson, New Haven, Conn., assignor, by direct and mesne assignments, to Kenmildon Inc., Wilmington, Del., a corporation of Delaware Application July 20, 1946, Serial No. 685,051

9 Claims. (Cl. 219—39)

This invention relates to an electric air heater.

Broadly, it is an object of my invention to blow heated air outward from a heater in a series of conical formations of varying diameters, such heated air being passed through a series of concentric open grooves diverging outwardly.

More particularly, it is an object of my invention to provide a heating unit having a series of concentric rings or ribs converging outwardly and which are so spaced apart and have varying angles in order to direct the heated air outward in conical formations of varying diameters.

A further object is to provide a heater which emits a series of heat rings each larger than the other thereby enabling the heat to reach all parts of a room quickly, thereby raising the room temperature more rapidly and uniformly.

A further object is to provide a self-contained portable unit which may be easily placed wherever it is desired to heat the air.

A further object is to provide a heat unit which may be placed in fixed position or be permanently affixed at the outlet of a cold air duct which runs either through the walls or ceilings in order to provide heated air to a space.

A further object is to provide an air heater containing heating elements in combination with a fan comprising blades of predetermined pitch, number and speed in order to obtain a wide selection in the amount of heat units projected into space and thereby provide a more efficient method of heating space using less electric current for a given cubic area than types of heaters heretofore used.

Heretofore, heaters have been made comprised of metal which absorbs a good deal of the heat and heats the local area around the heater. My heater projects the heat as fast as it is developed into space thus radiating the heat quickly and more uniformly throughout a given space.

For a fuller understanding of the nature and objects of my invention, reference is had to the following detailed description, in connection with the accompanying drawings, in which.

Figures 7, 11:
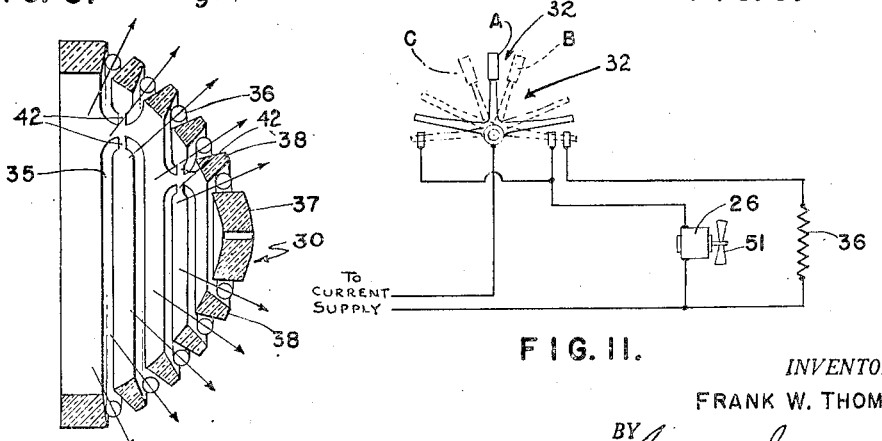
Figure 7 is a section of the heat unit taken through line 7—7 of Figure 2.
Figure 11 is a wiring diagram showing the electrical connections of the heating unit, motor and a three-position switch.
Figure 12:
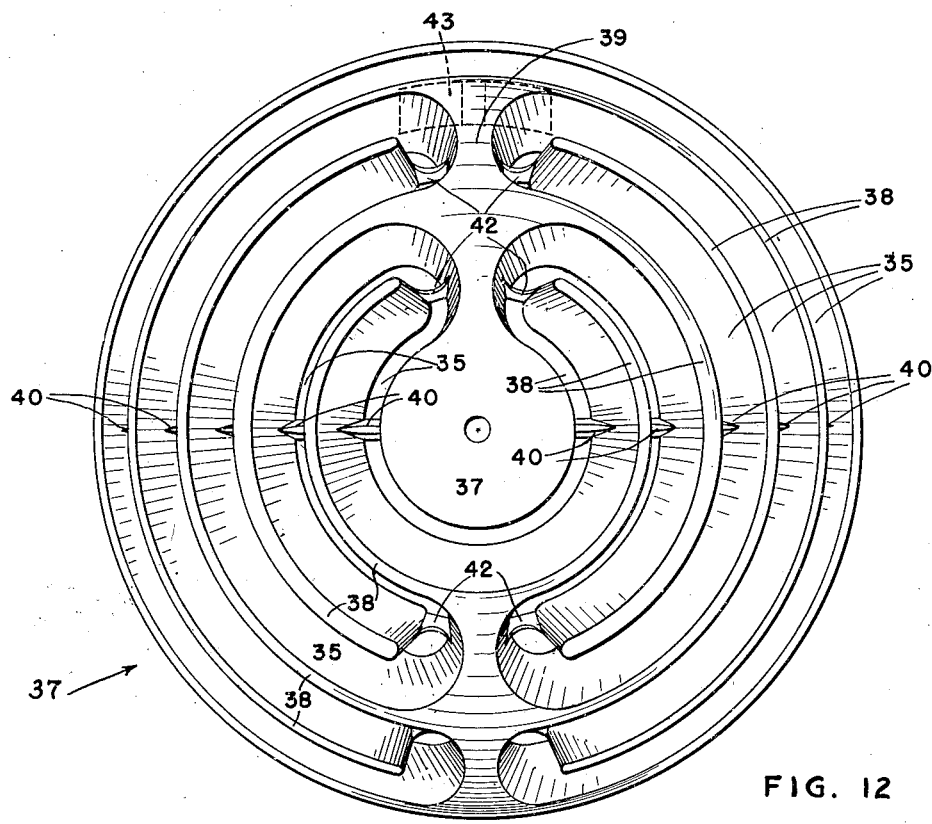
Figure 12 is a front view of the refractory member.
Figure 13:
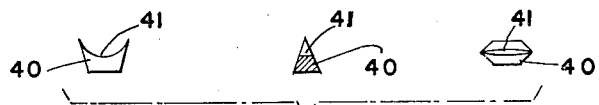
Figure 13 are views of the bridges between the ribs, showing a side view, a section and a top view.
Figure 14:
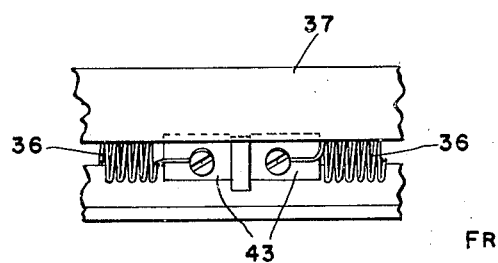
Figure 14 is a top view of the terminal block and heating elements.

Referring to the drawings, numeral 25 represents an electric air heater comprising a motor 26 having a shaft 27 upon which there is mounted a fan 28. Mounted upon the motor housing is a bracket 29 which supports a heating unit 30. Bracket 29 also supports a wire guard 31 to protect heating unit 30. A switch 32 is used to cause the fan 28 to revolve and also to permit current to flow through the heating elements 36. Switch 32 may be operated in three positions as indicated in Figure 11, that is the "off" position, a position in which the fan only revolves and a third position in which the fan revolves and the current flows through the heating elements 36. Motor 26 is mounted upon a base 33 which permits the motor, including the heating unit, to be directed upwardly or downwardly by loosening or tightening wing-nut 34.

Figures 1, 2:
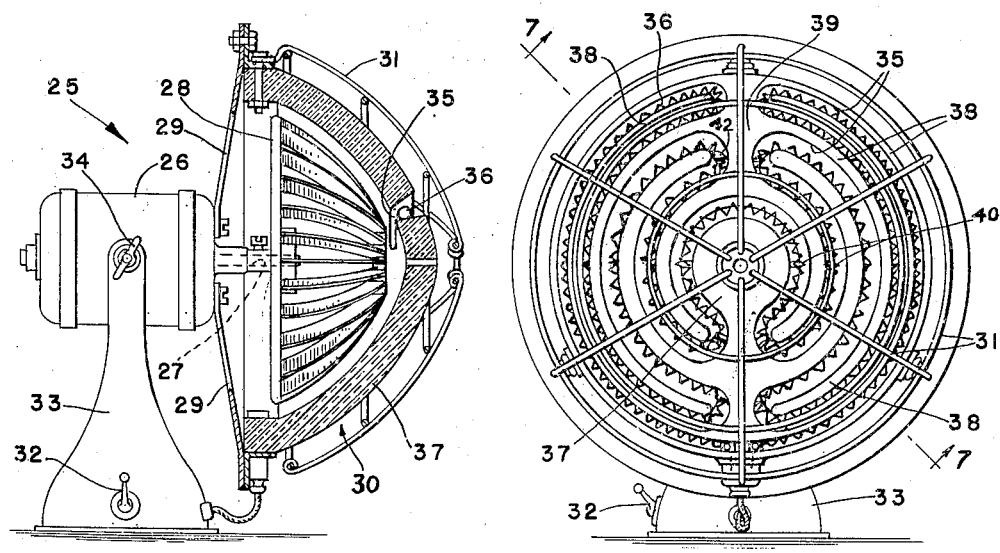
Figure 1 is a side view of an electric heater partly in section.
Figure 2 is a front view thereof.
Figures 3, 4, 5:
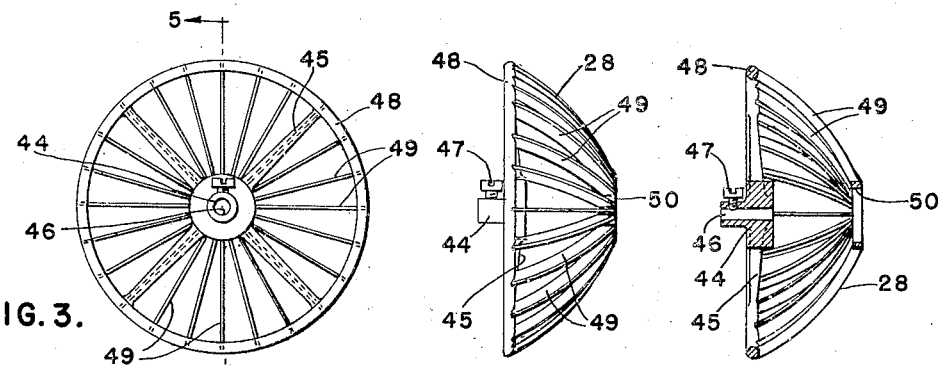
Figure 3 is a front view of a fan used within the heater.
Figure 4 is a side view thereof.
Figure 5 is a section taken through a line 5—5 of Figure 3.

Heating unit 30 is preferably made of ceramic or other electrical non-conducting or refractory material. Unit 30 has a series of concentric open grooves 35 diverging outwardly and which are arcuately disposed on each side of a central line and in which heating elements 36 are positioned and which are preferably of a resistance wire commonly used in electric heaters of various types. Heating unit 30 is composed of a ceramic member 37 preferably of a parabolic shape having a series of concentric open grooves 35 diverging outwardly and which lie between ribs 38. Ribs 38 are held together by vertical spacing portions 39 which follow the arcuate contour of ceramic member 37. A series of bridges 40 running horizontally between ribs 38 aid in supporting the ribs. Bridges 40 are flush with the inner surface of ceramic member 37 and the tops thereof are arced as shown at 41 and the tops 41 lie below the outer contour surface of the ceramic member 37. Bridges 40 are spaced horizontally and arcuately across ceramic member 37 along the horizontal axis. Bridges 42 are similar in formation to bridges 40 except that they are spaced on either side of the vertical axis and fall between the curves of grooves 35 and ridges 38. The tops of bridges 42 are also arcuately shaped similar to the arced surfaces 41, such tops being also below the outer arcuate surface of the ceramic member 37. The sides of ribs 38 are angularly fashioned with respect to each other, the spaces between ribs 38 being tapered and diverging outwardly in order to direct the heated air outwardly in divergent conical formations of varying diameters at different angles. The angular sides of ribs 38 may be varied depending upon the contour of the ceramic member 37. The angle of the sides of ribs 38 may also be varied by design of different units to obtain a direction of the heated air. The heating elements 36 are laid within the open grooves 35 and follow the grooves as shown in Figure 2. A terminal block 43 lies within the largest or end groove, preferably at the base, and the upper surface is below the outer surface of ceramic member 37. The ends of the heating element are attached to the terminal contacts which are affixed to the terminal block 43 from which a control circuit leads to switch 32 and source of current supply.

Fan 28 has a hub 44 which is attached to spider 45 and has a central opening 46 adapted to be seated upon shaft 27. A set screw 47 tightens the hub upon shaft 27. The outer legs of spider 45 are attached to a ring 48. A series of fan blades 49 attached to ring 48 follow the contour of the inner surface of ceramic member 37 with the outer end attached to a small supporting ring 50. Fan blades 49 are fashioned at an angle determinable in accordance with the required control of the volume of air flow.

Figure 6:
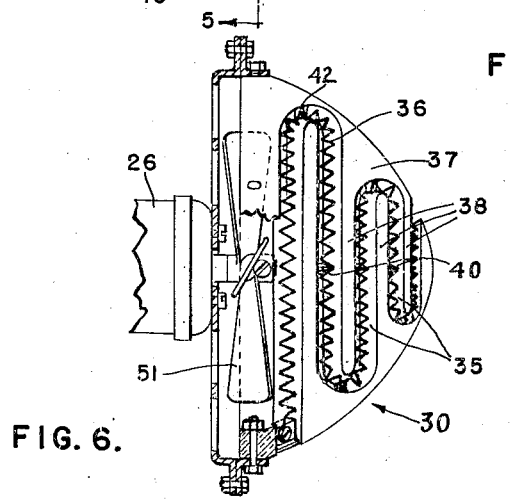
Figure 6 is a side view of a portion of a modified heating unit showing a different type of fan.

Referring to Figure 6, instead of using fan 28, any conventional type of fan blades may be used such as the fan blade 51 shown.

Figures 8, 9:
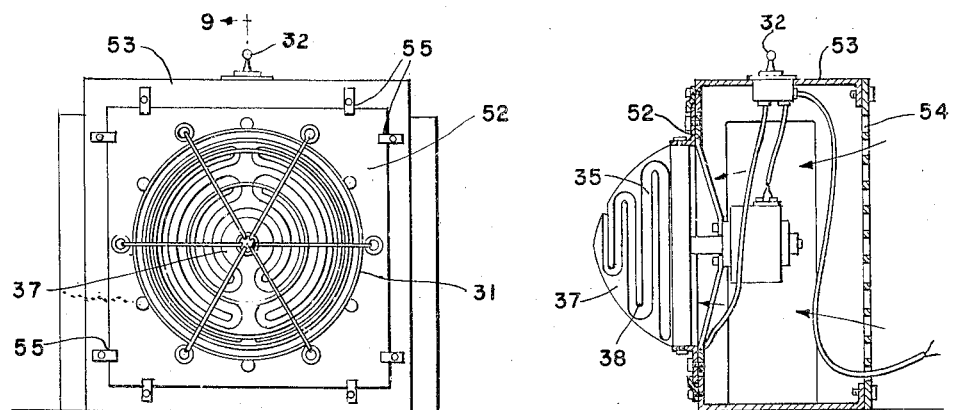
Figure 8 is a front view of a modified heater.
Figure 9 is a side view of the heater shown in Figure 8 partly in section.

Referring to Figures 8 and 9, numeral 52 represents a removable panel upon which the heating unit shown in Figures 1, 2 and Figure 6 may be mounted. Panel 52 substitutes the base 33 shown in Figures 1 and 2. A cabinet 53 which may be made of wood, metal or plastic is used as a housing for the assembled unit comprised of the motor, fan, wires, switch and heating unit. A perforated rear panel 54 is mounted at the rear of the cabinet and permits air to be sucked through by the fan. The entire unit which is mounted on panel 52 may be readily removed for inspection by removing lugs 55. The arrows shown in Figures 7 and 9 indicate the air flow through the rear perforated panel of Figure 9 and through the heating element and through the open grooves of the heating unit.

Figure 10:
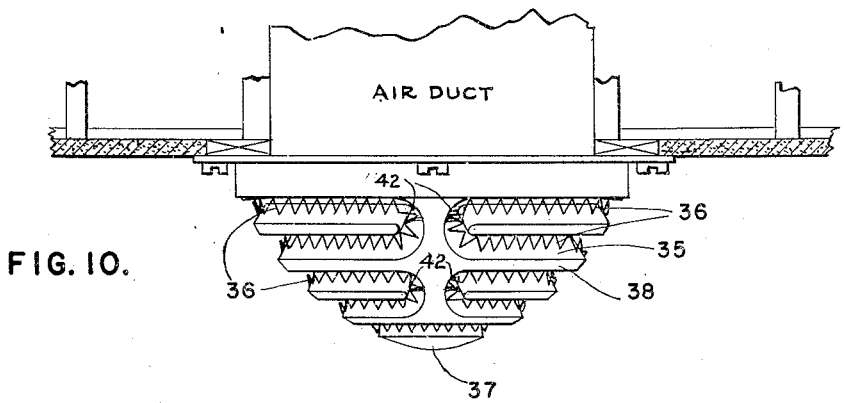
Figure 10 is a modified view of the heating unit fixed at the end of a cold air duct.

Referring to Figure 10, the same heating unit shown in Figures 1, 2 and 6 may be used except that the fan has been eliminated. This unit may be placed at the end of a cool air duct which emanates from a ceiling or wall and connects to a standard wiring system with a wall switch which can be turned on and off as desired.

Referring to the schematic drawing of Figure 11, when the switch is moved from the "off" position A to the position B, both the fan and the heating element are in operation. When the switch is moved from position A to position C the fan only is in operation sending cool air through the ceramic member 37.

It is obvious that various modifications and changes may be made in the details of construction without departing from the general spirit of the invention.

I claim:

1. A heating unit consisting of a parabolic shaped refractory member, concentric open grooves diverging outwardly within said member to permit air to pass therethrough, electric heating elements within said grooves whereby air forced over and through said elements when heated directs the heated air outwardly in conical formations of varying diameters.

2. A heating unit consisting of a parabolic shaped refractory member, concentric open grooves diverging outwardly within said member and concentric ribs converging outwardly on said member, said grooves permitting the air to pass therethrough, electric heating elements within said grooves whereby air forced over and through said elements when heated forces the heated air outwardly in conical formations of different sizes.

3. A heating unit consisting of a parabolic shaped refractory member, concentric open grooves diverging outwardly in said member, concentric outwardly tapered ribs in said member, a fan mounted behind said heating unit, said grooves permitting the air to be passed therethrough, electric heating elements within said grooves, whereby air forced over and through said elements when heated forces the heated air outwardly in conical formations of different sizes.

4. A heating unit consisting of a parabolic shaped refractory member, concentric open grooves diverging outwardly in said member, concentric outwardly tapered ribs in said member, a fan mounted behind said heating unit, electric heating elements within said grooves, a motor for rotating said fan, whereby air forced over and through said elements when heated forces the heated air outwardly in conical formations of different sizes.

5. A heating unit consisting of a parabolic shaped refractory member, concentric open grooves diverging outwardly in said member, concentric outwardly tapered ribs in said member, a fan mounted behind said heating unit, electric heating elements within said grooves, a motor for rotating said fan, a switch for operating said motor and said heating elements, whereby air forced over and through said elements when heated forces the heated air outwardly in conical formations of different sizes.

6. In an electric air heater of the character described comprising a motor having a shaft, a fan mounted upon such a shaft, a heating unit mounted upon said motor, said heating unit comprised of a parabolic shaped refractory member, a series of concentric outwardly tapered ribs and a series of concentric open grooves diverging outwardly in said member, heating elements lying within said grooves, a three-position switch for operating said motor and said heating elements whereby when said heating elements and said fan are both in operation the heated air will be directed outward in conical formations of varying diameters.

7. A heating unit consisting of a parabolic shaped refractory member, concentric open grooves diverging outwardly in said member, concentric outwardly tapered ribs in said member, said ribs having sides of varying angles to direct heat outward, a fan mounted behind said heating unit, said grooves permitting the air to be passed therethrough, electric heating elements within said grooves, a motor for rotating said fan, a three-position switch for operating said motor and said heating elements, whereby air forced over and through said elements when heated forces the heated air outwardly in conical formations of different sizes.

8. A heating unit consisting of a parabolic shaped refractory member, concentric open grooves diverging outwardly in said member, concentric outwardly tapered ribs in said member, a fan mounted behind said heating unit, said fan following the inner contour of said refractory member and having pitched blades, said grooves permitting the air to be passed therethrough, a motor for rotating said fan, a switch for operating said motor and said heating elements whereby air forced over and through said elements when heated forces the heated air outwardly in conical formations of different sizes.

9. A heating unit consisting of a parabolic shaped refractory member, concentric open grooves diverging outwardly in said member, concentric outwardly tapered ribs in said member, bridges between said ribs the tops of which are arced and lie below the outer contour of said refractory member, a fan mounted behind said heating unit, electric heating elements within said grooves, a motor for rotating said fan, a switch for operating said motor and said heating elements, said fan following the inner contour of said refractory member and having pitched blades, whereby air forced over and through said elements when heated forces the heated air outwardly in conical formations of different sizes.

FRANK W. THOMPSON.

REFERENCES CITED

The following references are of record in the file of this patent:

UNITED STATES PATENTS

| Number | Name | Date |
|---|---|---|
| 1,958,007 | MacDougall | May 8, 1934 |
| 2,153,239 | Curci | Apr. 4, 1939 |
| 2,239,957 | Genda | Apr. 29, 1941 |